UNITED STATES PATENT OFFICE.

ANDREW A. DUNHAM, OF BAINBRIDGE, NEW YORK, ASSIGNOR TO CASEIN COMPANY OF AMERICA, A CORPORATION OF NEW JERSEY.

SIZING AND METHOD OF PREPARING SAME.

1,080,143.     Specification of Letters Patent.     Patented Dec. 2, 1913.

No Drawing.     Application filed January 10, 1913. Serial No. 741,311.

*To all whom it may concern:*

Be it known that I, ANDREW A. DUNHAM, a citizen of the United States, residing at Bainbridge, in the county of Chenango and State of New York, have invented or discovered certain new and useful Improvements in Sizings and Methods of Preparing Same, of which the following is a specification, reference being had therein to the accompanying drawings.

This invention or discovery has for its object the production of a starch sizing which may be used in connection with certain clays for paper-coating purposes so that the coating may be applied in a better manner than has hitherto been possible.

Starch sizings are now being largely used in the paper coating industry, and these sizings are made by treating starch with various chemicals in such a manner that when the starch is dissolved, by means of water and heat, it has a proper consistency for mixing with china clay, pulp colors and earth bases in general. Starch sizing preparations, when mixed with certain clays or kaolins, have the peculiar property of thickening the same to such an extent that the mixture cannot be satisfactorily used for paper coating purposes. For example, if 18 parts of starch sizing, dissolved in four parts of water, be added to 100 parts of Georgia clay which has previously been mixed with 100 parts of water, the mixture, instead of becoming thin and flowing freely with paper coating brushes, will become thick and spongy to such an extent that it cannot be run on a coating machine without leaving the paper in an uncommercial state, owing to brush marks and want of uniformity of the coating. The same sizing mixed in the same proportion with an English kaolin will produce a coating which will work out free, flow well and coat the paper in a fairly satisfactory manner.

The reason for variance in the action of the starch sizings on different kinds of clay is not well known. Theories have been advanced that in one case the clay may contain more humic acid than in another case, and that this variation of humic acid accounts for the difference in the co-action of the clays and sizings. While it is not certain that this explanation is correct it has been discovered that if a small percentage of an alkaline silicate, preferably silicate of soda, either in a dry or a wet form, be added to a modified starch sizing or to the clay the resulting mixture will work satisfactorily for paper coating purposes. The amount of silicate of soda, or other alkaline silicate, which will ordinarily be used will be about 4% of the dry starch sizing, but this percentage may require some variation for use with different clays from different localities; so that the invention or discovery is not to be understood as being limited to any prescribed percentage of the alkaline silicate, which may be silicate of soda, silicate of potash, or any other equivalent alkaline silicate.

A good example of the proportions of materials suitable for paper coating under this new discovery would be as follows: To 180 lbs. of dry modified starch sizing add about 7.2 lbs. of dry alkaline silicate, and then add 720 lbs. of water, and heat the mixture, to dissolve the same, to about 180° F. This solution may then be added to 1000 lbs. of Georgia clay which has previously been mixed with 1000 lbs. of water. The resulting product is a paper coating mixture which will flow freely under the brushes of a paper coating machine, and make an adhesive coating and will not show brush marks.

Even with an English clay, which works fairly well with ordinary starch sizing, it is an advantage to use the alkaline silicate, as it gives a thinner working mixture, for paper coating, having less tendency for leaving any brush marks than such coating, without the silicate of soda, has.

The sizing mixture, consisting of a modified starch, and an alkaline silicate, may be placed on the market either in dry or wet form, to be subsequently mixed with the paper-coating clay and water, as above indicated, to form the paper coating mixture.

Having thus described my invention or discovery I claim and desire to secure by Letters Patent:

1. A sizing, for use in paper-coating, consisting of a mixture of one part of an alkaline silicate and about twenty-five parts of modified starch.

2. A paper-coating sizing consisting of a mixture of one part of silicate of soda with about twenty-five parts of modified starch.

3. The herein-described method of preparing a paper-coating sizing, consisting in mixing about one part of an alkaline silicate with about twenty-five parts of modified starch and then dissolving the mixture by means of a liquid and heat.

In testimony whereof I affix my signature, in presence of two witnesses.

ANDREW A. DUNHAM.

Witnesses:
O. L. CRUMB,
R. C. WILCOX.